US008878892B2

(12) United States Patent
Liu et al.

(10) Patent No.: US 8,878,892 B2
(45) Date of Patent: Nov. 4, 2014

(54) MULTI-PICTURE SYNTHESIZING METHOD AND APPARATUS IN CONFERENCE TELEVISION SYSTEM

(75) Inventors: Junli Liu, Shenzhen (CN); Jun Chen, Shenzhen (CN); Hui Guan, Shenzhen (CN)

(73) Assignee: ZTE Corporation (CN)

( * ) Notice: Subject to any disclaimer, the term of this patent is extended or adjusted under 35 U.S.C. 154(b) by 288 days.

(21) Appl. No.: 13/508,763

(22) PCT Filed: Oct. 26, 2010

(86) PCT No.: PCT/CN2010/078113
§ 371 (c)(1),
(2), (4) Date: May 9, 2012

(87) PCT Pub. No.: WO2011/054261
PCT Pub. Date: May 12, 2011

(65) Prior Publication Data
US 2012/0229593 A1     Sep. 13, 2012

(30) Foreign Application Priority Data

Nov. 9, 2009    (CN) .......................... 2009 1 0110040

(51) Int. Cl.
| | |
|---|---|
| H04N 7/15 | (2006.01) |
| H04L 12/18 | (2006.01) |
| H04N 21/2343 | (2011.01) |
| H04N 21/431 | (2011.01) |
| H04N 21/4788 | (2011.01) |
| H04N 7/14 | (2006.01) |

(52) U.S. Cl.
CPC .... *H04N 21/234363* (2013.01); *H04L 12/1813* (2013.01); *H04N 21/4316* (2013.01); *H04N 7/152* (2013.01); *H04N 21/4788* (2013.01); *H04N 7/147* (2013.01)
USPC .......... 348/14.08; 84/609; 345/204; 345/441; 345/629; 348/51; 348/211.1; 348/459; 348/565; 348/718; 358/1.14; 358/1.15; 375/240.12; 375/240.16; 382/238; 386/200; 386/210; 386/278

(58) Field of Classification Search
CPC ....... H04N 5/4401; H04H 20/14; G01R 1/071
USPC ................. 345/204, 441, 629; 348/14.08, 51, 348/211.1, 220.1, 231.2, 416, 459, 564, 348/565, 674, 718, 65, 222.1, 296; 358/1.15, 1.14; 375/240.12, 240.16; 382/238; 386/278, 200, 210; 709/217; 84/609

See application file for complete search history.

(56) References Cited

U.S. PATENT DOCUMENTS

| | | | | |
|---|---|---|---|---|
| 5,510,858 | A | * | 4/1996 | Shido et al. .................... 348/718 |
| 5,745,661 | A | * | 4/1998 | Koh et al. ..................... 358/1.14 |

(Continued)

FOREIGN PATENT DOCUMENTS

| | | |
|---|---|---|
| CN | 101198088 A1 | 6/2008 |
| CN | 201118783 A1 | 9/2008 |

(Continued)

OTHER PUBLICATIONS

PCT International Search Report Dated Feb. 10, 2011, Applicant ZTE Corporation et al., Application No. PCT/CN2010/078113.

(Continued)

*Primary Examiner* — Gerald Gauthier
(74) *Attorney, Agent, or Firm* — Brooks Kushman P.C.

(57) ABSTRACT

A multi-picture synthesizing method in a conference television system is disclosed by the present invention. The method includes: synthesizing multiple pictures into a bottom layer of a multi-picture image according to a preset multi-picture layout, creating at least one layer of image layer over a bottom layer of a multi-picture image, creating at least one image frame in each image layer, and adjusting a pre-output picture corresponding to the image frame according to output characteristics of each image frame, and outputting the pre-output picture into the corresponding image frame. The present invention further discloses a multi-picture synthesizing apparatus in a conference television system. According to the technical scheme of the present invention, the multi-picture synthesizing of a conference television system is implemented flexibly and simply.

18 Claims, 5 Drawing Sheets

(56) References Cited

U.S. PATENT DOCUMENTS

| | | | |
|---|---|---|---|
| 5,809,208 A * | 9/1998 | Komori | 386/200 |
| 5,875,298 A * | 2/1999 | Harigaya et al. | 348/416.1 |
| 5,886,275 A * | 3/1999 | Kato et al. | 84/609 |
| 5,917,546 A * | 6/1999 | Fukui | 348/296 |
| 5,999,214 A * | 12/1999 | Inagaki | 348/211.12 |
| 6,184,922 B1 * | 2/2001 | Saito et al. | 348/65 |
| 6,222,986 B1 * | 4/2001 | Inuiya | 386/210 |
| 6,522,329 B1 * | 2/2003 | Ihara et al. | 345/441 |
| 6,665,006 B1 * | 12/2003 | Taguchi | 348/211.1 |
| 6,687,408 B2 * | 2/2004 | Boon | 382/238 |
| 6,795,125 B2 * | 9/2004 | Yui | 348/564 |
| 6,856,348 B1 * | 2/2005 | Okada | 348/231.2 |
| 6,967,665 B2 * | 11/2005 | Ishikawa et al. | 345/629 |
| 7,064,780 B2 * | 6/2006 | Shimizu | 348/220.1 |
| 7,154,558 B2 * | 12/2006 | Yui et al. | 348/565 |
| 7,158,570 B2 * | 1/2007 | Nagumo et al. | 375/240.16 |
| 7,298,515 B2 * | 11/2007 | Takahashi | 358/1.15 |
| 7,336,317 B2 * | 2/2008 | Yui et al. | 348/459 |
| 7,911,502 B2 * | 3/2011 | Suzuki | 348/222.1 |
| 8,111,333 B2 * | 2/2012 | Luo | 348/674 |
| 8,471,898 B2 * | 6/2013 | Neuman | 348/51 |
| 2002/0167503 A1 * | 11/2002 | Tsunoda et al. | 345/204 |
| 2003/0001878 A1 | 1/2003 | Matsumoto | |
| 2006/0045182 A1 * | 3/2006 | Yokose | 375/240.12 |
| 2006/0206582 A1 * | 9/2006 | Finn | 709/217 |
| 2007/0120873 A1 | 5/2007 | Relan et al. | |
| 2009/0317050 A1 * | 12/2009 | Son et al. | 386/52 |
| 2012/0038740 A1 | 2/2012 | Zhang et al. | |
| 2012/0229593 A1 * | 9/2012 | Liu et al. | 348/14.08 |

FOREIGN PATENT DOCUMENTS

| | | |
|---|---|---|
| CN | 101365117 A | 2/2009 |
| CN | 101534411 A | 9/2009 |
| CN | 101742221 A | 6/2010 |
| EP | 1 158 788 A1 | 11/2001 |
| WO | 0133835 A1 | 5/2001 |

OTHER PUBLICATIONS

Extended European Search Report Dated Mar. 27, 2014, Application No. 10827875.5-1905 / 2487902 PCT/CN2010078113, Applicant ZTE Corporation, 8 Pages.

* cited by examiner

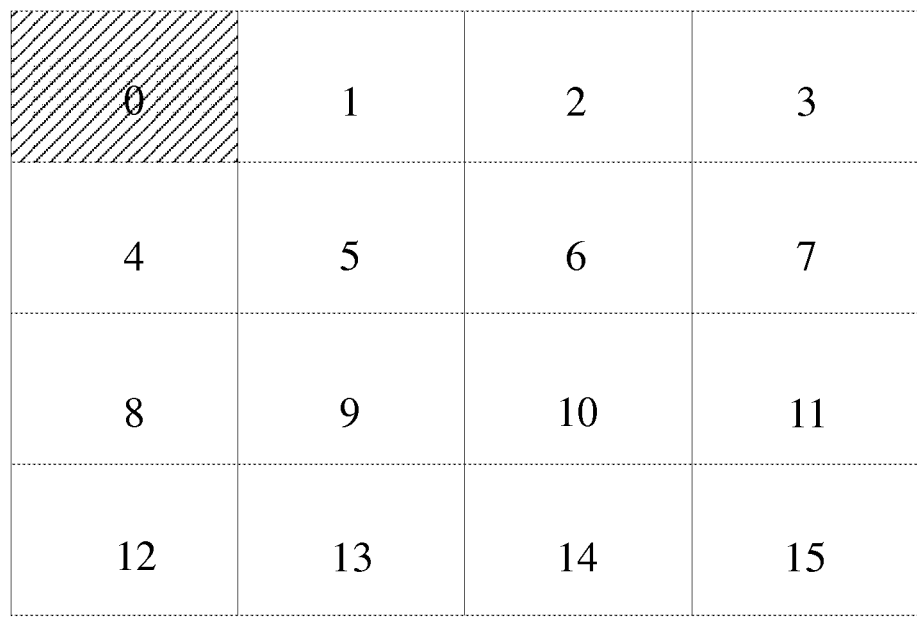
FIG. 5
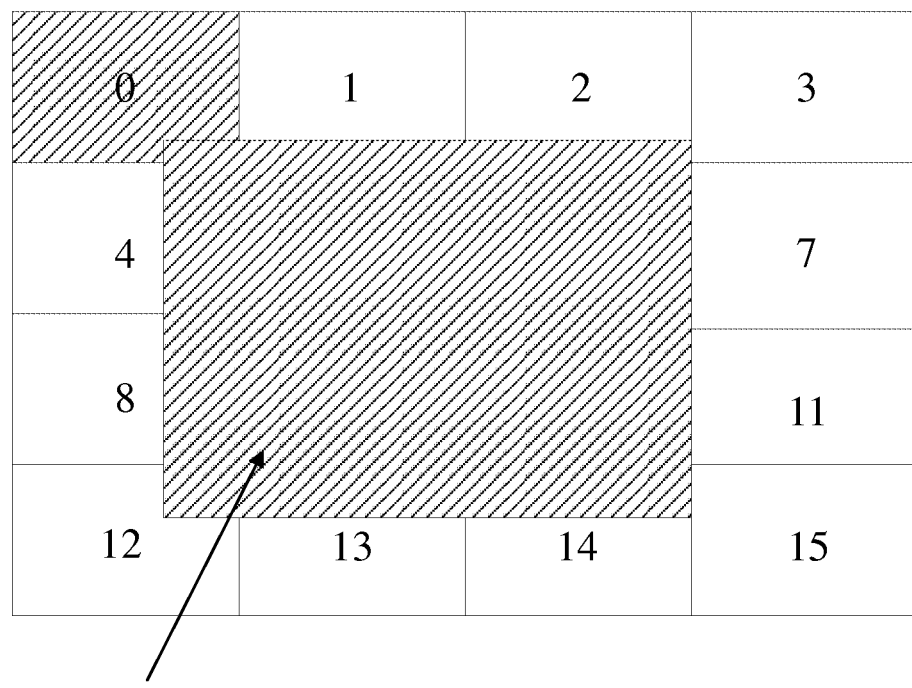
Amplified Image No. 0   FIG. 6

MULTI-PICTURE SYNTHESIZING METHOD AND APPARATUS IN CONFERENCE TELEVISION SYSTEM

CROSS-REFERENCE TO RELATED APPLICATIONS

This application is a U.S. national phase of PCT Application No. PCT/CN2010/078113 filed Oct. 26, 2010 which claims priority to Chinese Application No. 200910110040.0 filed Nov. 9, 2009 (now Chinese Patent No. 101742221), the disclosures of which are incorporated in their entirety by reference herein.

TECHNICAL FIELD

The present invention relates to the field of conference televisions, and in particular, to multi-picture synthesizing method and apparatus in a conference television system.

BACKGROUND OF THE RELATED ART

Conference televisions, as advanced communication means, have been widely used in the fields such as government meetings, distance learning, remote diagnostics and trans-regional remote conferences etc.

In the related art, a method for implementing multi-picture in a conference television is at a Multipoint Control Unit (MCU) side, wherein, a Digital Signal Processor (DSP) at the MCU side firstly decodes code streams transmitted by multiple terminals, then performs multi-picture synthesizing on the decoded data according to multi-picture layout information issued by a master control Multipoint Processor (MP) in the MCU side, and finally encodes and then outputs the synthesized image.

In the related art, if it is to implement amplifying one of multiple pictures temporarily for view, it is very inconvenient to retrieve the original image immediately, which needs to switch a multi-picture layout, i.e., changing an existing multi-picture layout A into a multi-picture layout B (in the layout B, the picture needed to be viewed is relatively large), and retrieve the multi-picture layout A after the viewing is complete.

In the processing at the MCU side, when changing the multi-picture layout A into the multi-picture layout B, the master control MP needs to issue the layout B to the DSP and the DSP to compute multi-picture related information of the layout B (initial coordinates, width, height etc. of each picture in the multiple pictures) and to perform corresponding multi-picture synthesizing, and then encode and output; and the master control MP needs to re-issue the layout A to the DSP and the DSP re-computes multi-picture information of the layout A and performs corresponding multi-picture synthesizing.

Disadvantages of the above method are in that: first, the processing in the MCU is complex, and there are multiple repeated computations; and second, the image needed to be amplified cannot be displayed flexibly, and can only be selected according to the current layout.

SUMMARY OF THE INVENTION

In view of the above background, the present invention provides multi-picture synthesizing method and apparatus in a conference television system, which can implement the multi-picture synthesizing in the conference television system flexibly and simply.

In order to solve the above technical problem, the present invention uses the following technical schemes.

A multi-picture synthesizing method in a conference television system comprises:

synthesizing multiple pictures into a bottom layer of a multi-picture image according to a preset multi-picture layout; and creating at least one image layer over the bottom layer of the multi-picture image, creating at least one layer of image frame in each image layer, and adjusting a pre-output picture corresponding to the image frame according to output characteristics of each image frame, and outputting the pre-output picture into the corresponding image frame.

In the above method, the output characteristics of the image frame comprise a position of the image frame and a size of the image frame.

In the above method, the image frame is created through a mouse signal in a WEB page.

In the above method, the method further comprises closing the image frame through a mouse signal in the WEB page.

In the above method, the method further comprises adjusting layers and/or output characteristics of various image frames of various layers over the bottom layer of the multi-picture image.

In the above method, the pre-out picture is a picture in the bottom layer of the multi-picture image or is other picture transmitted to display.

The present invention further discloses a multi-picture synthesizing apparatus in a conference television system, comprising an image bottom layer synthesizing module and an image frame synthesizing module set at a control end of the conference television system, wherein, the image bottom layer synthesizing module is configured to synthesize multiple pictures into a bottom layer of a multi-picture image according to a preset multi-picture layout; and the image frame synthesizing module is configured to create at least one layer of image layer over the bottom layer of the multi-picture image, create at least one image frame in each image layer, and adjust a pre-output picture corresponding to the image frame according to output characteristics of each image frame, and output the pre-output picture into the corresponding image frame.

In the above apparatus, the output characteristics of the image frame comprise a position of the image frame and a size of the image frame.

In the above apparatus, the apparatus further comprises:

an image frame adjusting module, configured to adjust layers and/or output characteristics of various image frames of various layers over the bottom layer of the multi-picture image.

In the above apparatus, the pre-out picture is a picture in the bottom layer of the multi-picture image or is other picture transmitted to display.

The present invention performs hierarchical synthesizing on the multi-picture of the conference television system, synthesizes an initial multi-picture layout into a bottom layer of an image, then creates an upper layer image frame over the bottom layer of the image, and outputs a picture needed to be viewed temporarily to the upper layer image frame, and thus, there is no need to change the original multi-picture layout of the conference television system, complex processing computation is not needed in the MCU, and the image in the upper layer image frame can be adjusted flexibly according to the output characteristics of the image frame. Therefore, the multi-picture synthesizing of the conference television system is implemented flexibly and simply.

BRIEF DESCRIPTION OF DRAWINGS

FIG. 5 is a diagram of a 16-picture layout before secondary synthesizing according to an example of the present invention.

FIG. 6 is a diagram of a layout after amplifying a picture with a number being 0, after secondary synthesizing according to an example of the present invention.

PREFERRED EMBODIMENTS OF THE PRESENT INVENTION

The basic idea of the present invention is as follows.

The present invention will be described in detail with respect to accompanying drawings and in conjunction with specific embodiments hereinafter.

The present invention is applied to a conference television system, which primarily relates to processing at a MCU side of the conference television system, i.e., a control end of the conference television system.

Figure 1:
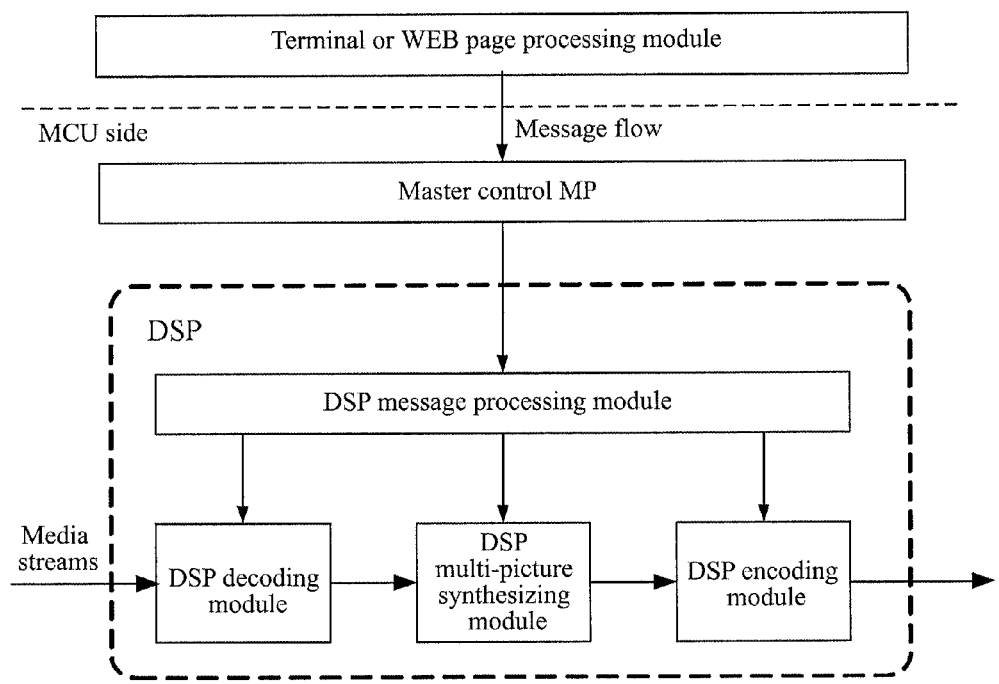
FIG. 1 is a block diagram of a system at a MCU side according to an example of the present invention.

FIG. 1 is a block diagram of a system at a MCU side according to an example of the present invention. As shown in FIG. 1, a message stream transmitted by a terminal or WEB page processing module reaches the MCU side, which comprises a master control MP and a DSP. The master control MP first processes the message stream, transmits the processed message stream to a message processing module of the DSP, which comprises information such as a multi-picture layout etc. Meanwhile, the DSP receives a media stream, and according to an indication of the message, a DSP decoding module, a DSP multi-picture synthesizing module and a DSP encoding module decode code streams of the media stream, perform multi-picture synthesizing, and encode and output the synthesized image in turn.

FIG. 5 is a 16-picture layout before secondary synthesizing according to an example of the present invention. As shown in FIG. 5, it is assumed that a multi-picture layout issued by a master control MP to a DSP is a 16-picture layout illustrated in FIG. 5, and numbers of the pictures are 0-15 from left to right and from top to bottom in turn. Generally, various pictures in the 16 pictures are from different terminals, and these pictures are synthesized and output by the DSP in accordance with the multi-picture layout illustrated in FIG. 5, to form a 720P (1280×720) 16-picture image. In the present example, the image is referred to as a bottom layer of a multi-picture image.

When a user views the image illustrated in FIG. 5, if the user wants to amplify a picture with a picture number being 0 for view, one image layer is created over the bottom layer of the multi-picture image, one image frame is created in the image layer, and image data of the picture with the picture number being 0 is adjusted according to output characteristics of the image frame, and output to the image frame for display.

The output characteristics of the image frame primarily comprise a size and a position of the image frame, and the image frame is generally defined as a rectangle, and therefore, the size of the image frame is defined by a width and a height of the image frame. The position of the image frame is generally defined by initial coordinates of the image frame, and the initial coordinates of the image frame are generally coordinates of a certain vertex of the image frame.

Multiple image layers can be created. In each image layer, multiple image frames can be created, and each image frame can be adjusted in terms of layers (being adjusted from one image layer to another image layer) and output characteristics etc. When a user views the bottom layer of the multi-picture synthesizing image through a WEB page, the image frame can be created and the image can be output through mouse signals in the WEB page. For example, FIG. 6 is a layout after amplifying a picture with a number being 0, after secondary synthesizing according to an example of the present invention. As shown in FIG. 6, the picture with the number being 0 being amplified for view can be implemented only by dragging out a large rectangle frame over the bottom layer of the multi-picture image and then dragging the picture with the number being 0 of the 16 pictures into the rectangle frame with a mouse.

A pre-output picture in the image frame can be a certain picture in the bottom layer of the multi-picture synthesizing image, or can also be other picture transmitted to display, for example, YUV data of a photo during a meeting which is transmitted to display by a user.

For brevity, the present invention will be described by example of an image frame, using the image frame as a rectangle frame hereinafter. It can be understood that the processes are similar when there are multiple layers of and multiple image frames. In order to distinguish, multi-picture synthesizing of the bottom layer of the multi-picture image is referred to as primary picture synthesizing, and the creation of the image frame and the output of the image are referred to as secondary picture synthesizing.

As shown in FIG. 1, the terminal or WEB page processing module transmits a message to the MP to notify the MP that the user is to perform secondary picture synthesizing, wherein, a secondary picture synthesizing message comprises initial coordinates of the rectangle frame (210, 40), a width of the rectangle frame 750 and a height 450, and a need to put a picture with a number being 0 of the 16 pictures into the rectangle frame.

The MP obtains the above message, in addition to issuing the message of a need to perform multi-picture synthesizing on the 16 pictures (i.e., a primary picture synthesizing message, which comprises a need to perform multi-picture synthesizing, a number of the synthesized multiple pictures, a multi-picture layout) to the DSP, the message of a need to perform secondary picture synthesizing (comprising a need to perform the secondary picture synthesizing, initial coordinates, width and height of the rectangle frame, a number of a picture needed to be put into the rectangle frame) is also needed to be issued to the DSP.

At the DSP end, the DSP decoding module first receives compressed code streams transmitted by 16 terminals in turn, decodes each code stream circularly, and transmits the decoded YUV data to the DSP multi-picture synthesizing module.

The DSP multi-picture synthesizing module first determines that it is needed to perform multi-picture synthesizing currently, then obtains initial coordinates, width and height of each picture according to the number of multiple pictures and the multi-picture layout issued by the MP, then scales and synthesizes YUV data of each path, and completes multi-picture synthesizing on the 16 pictures.

After the primary multi-picture synthesizing, the DSP multi-picture synthesizing module determines that it is also needed to perform secondary picture synthesizing, and performs processing according to the initial coordinates of the rectangle frame (210, 40), the width of the rectangle frame 750 and the height 450, and a picture with a picture number being 0 needed to be transmitted to display. Assume that a width of the picture with the picture number being 0 needed to be transmitted to display is 320 and a height thereof is 180, as the width of the rectangular frame is 750 and the height thereof is 450, it is needed to scale the picture, i.e., scaling the picture with a number being 0 as 750×450 (note that the scaling needs to be done by using the original YUV data of the picture transmitted to display), and then performs secondary picture synthesizing on the scaled image in accordance with positions of the initial coordinates of the rectangular frame.

The DSP encoding module receives the code streams after being performed with the multi-picture synthesizing, performs encoding according to a code rate in a corresponding format, and the image needed to be viewed by a user can be obtained after the encoding (i.e., an image displayed in FIG. 6, a picture with a number being 16 is at the bottom layer, and a picture with a number being 0 is in the rectangular frame of the upper layer).

After the viewing is complete, the user closes the rectangular frame in the WEB page, and then the WEB page processing module notifies the MP that the user is to stop the secondary picture synthesizing.

After obtaining the above message, the MP issues a message of a need to stop the secondary synthesizing to the DSP in addition to issuing a message of a need to perform multi-picture synthesizing on the 16 pictures to the DSP.

At the DSP end, the DSP decoding module first receives compressed code streams transmitted by 16 terminals in turn, decodes each code stream circularly, and transmits the decoded YUV data to the DSP multi-picture synthesizing module.

The DSP multi-picture synthesizing module determines that it is needed to perform primary picture synthesizing currently, then obtains initial coordinates, width and height of each picture according to the number of multiple pictures and the multi-picture layout issued by the MP, then scales and synthesizes YUV data of each path, and completes multi-picture synthesizing on the 16 pictures.

After the multi-picture synthesizing, the DSP multi-picture synthesizing module determines that there is no need to perform secondary picture synthesizing, and skip to the next step directly.

The DSP encoding module receives the code streams after being performed with the multi-picture synthesizing, performs encoding according to a code rate in a corresponding format, and the image needed to be viewed by a user is retrieved after the encoding (i.e., the image displayed in FIG. 5).

In summary, the primary process of multi-picture synthesizing control according to an example of the present invention comprises the following steps.

In step A, the MP issues a multi-picture synthesizing message, and the DSP processes the message.

In step B, the DSP performs multi-path decoding on the code streams transmitted by multiple terminals.

In step C, the decoded data are performed with multi-picture synthesizing according to a multi-picture layout issued by a master control MP.

In step D, the synthesized image is encoded and then output.

In step E, the MP issues a message of starting multi-picture secondary synthesizing, or issues a message of stopping multi-picture secondary synthesizing, and the DSP processes the message.

In step F, when the multi-picture secondary synthesizing is started, after performing the multi-picture synthesizing, the DSP scales the image needed to be transmitted to display according to the size of the rectangular frame, and then performs secondary synthesizing on the scaled image onto the multi-picture, or not perform the secondary synthesizing.

If the processing is performed in accordance with the message and the data, the order of the process is A-->E-->B-->C-->F-->D.

Figure 2:
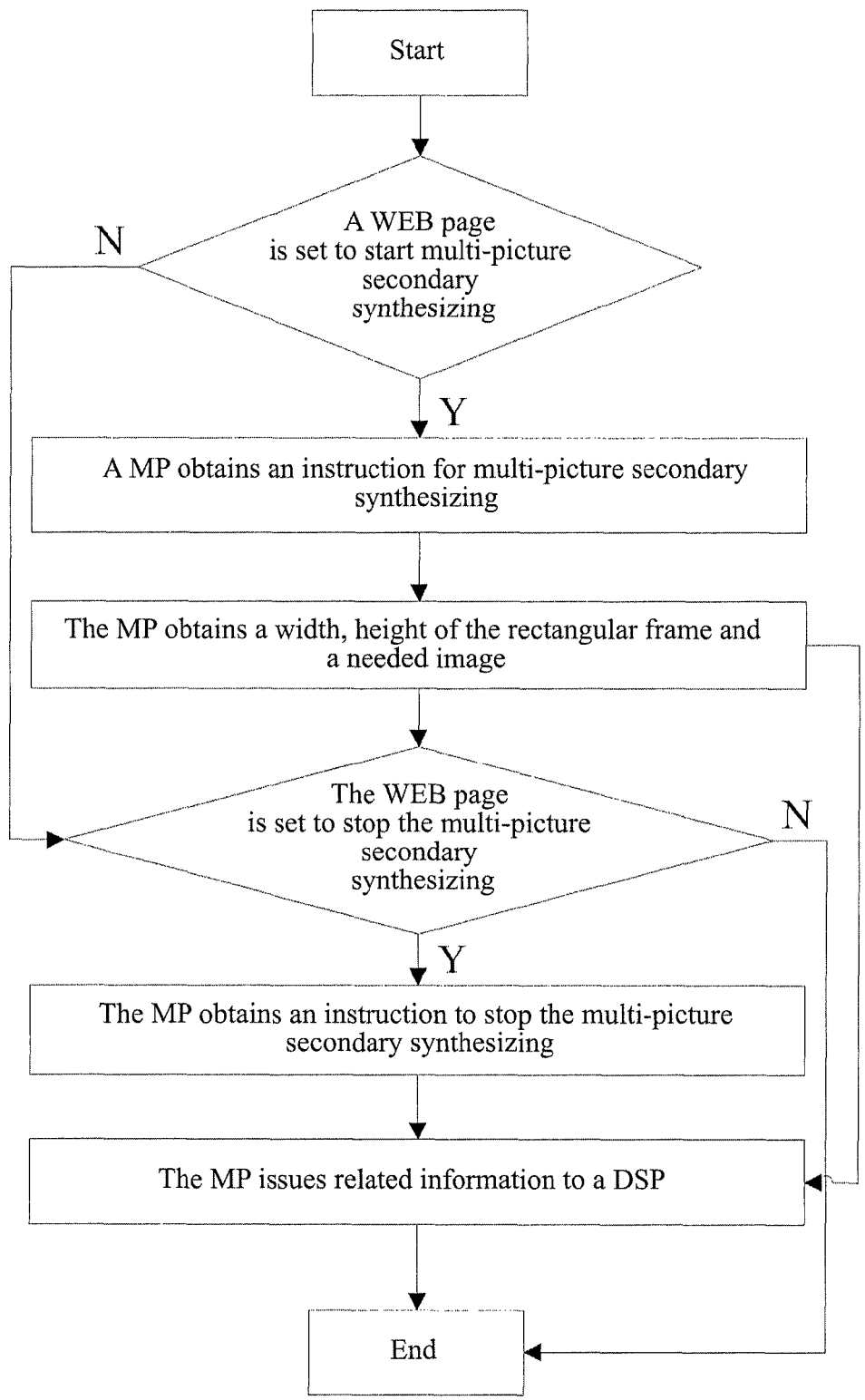
FIG. 2 is a flowchart of processing of a MP at a MCU side according to an example of the present invention.

FIG. 2 is a flowchart of a processing of a MP at a MCU side according to an example of the present invention. As shown in FIG. 2, the processing of a message when the MP processes the secondary synthesizing comprises the following steps.

In step one, whether the WEB page is set to start the multi-picture secondary synthesizing is determined, and if the WEB page is set to start the multi-picture secondary synthesizing, perform the next step; otherwise, perform step 4.

In step two, the MP obtains an instruction for multi-picture secondary synthesizing.

In step three, the MP obtains information such as a width, height of the rectangular frame, the required image, etc. from the instruction for multi-picture secondary synthesizing.

In step four, whether the WEB page is set to stop the multi-picture secondary synthesizing is determined, and if the WEB page is set to stop the multi-picture secondary synthesizing, perform the next step; otherwise, the process ends.

In step five, the MP obtains an instruction to stop multi-picture secondary synthesizing.

In step six, the MP issues a related message to the DSP.

In step seven, the process ends.

Figure 3:
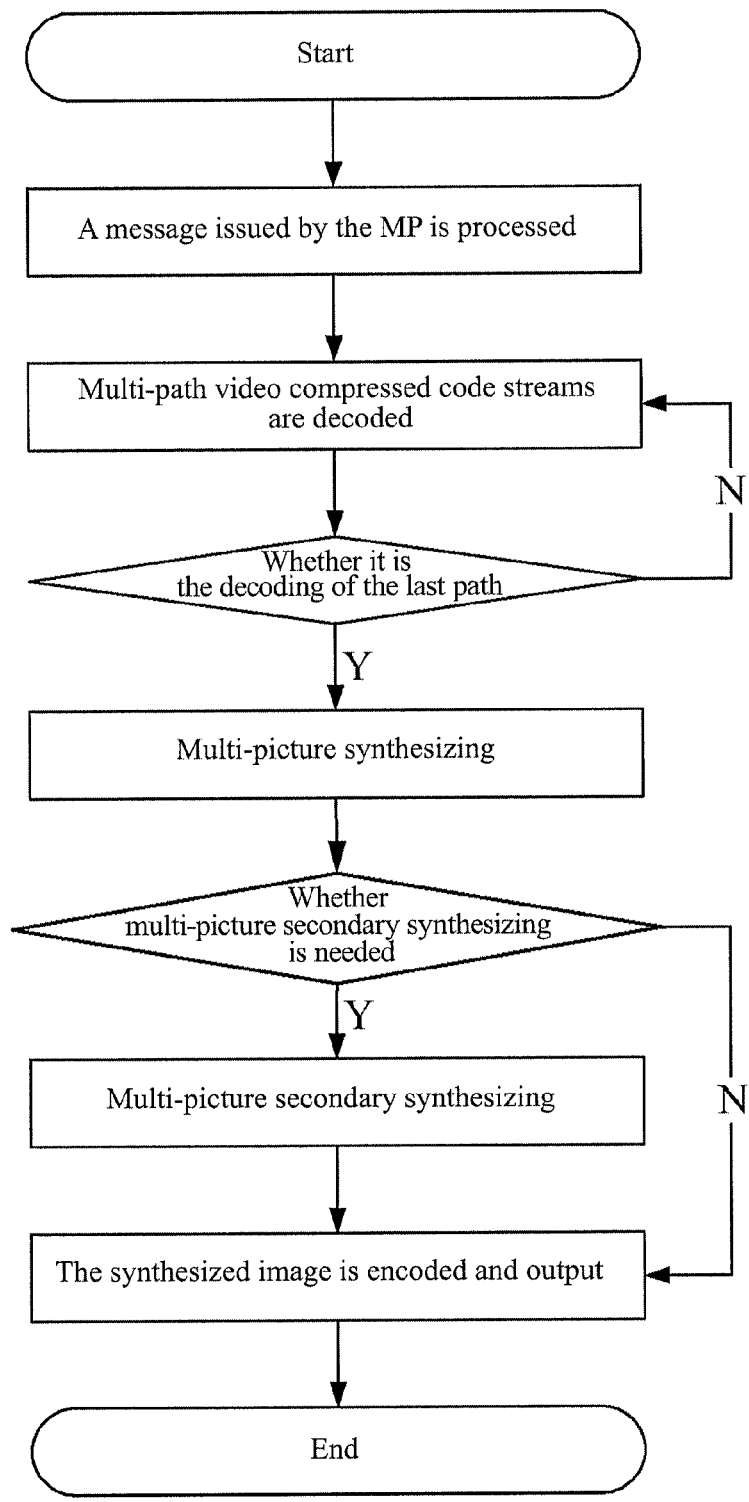
FIG. 3 is a flowchart of processing of a DSP at a MCU side according to an example of the present invention.

As shown in FIG. 3, processing of a message of a DSP primarily comprises the following steps.

In step one, the message issued by a MP is processed.

In step two, multi-path video compressed code streams are decoded, and if the decoding is performed on the last path, perform the next step; otherwise, continue to perform decoding.

In step three, multi-picture synthesizing is performed.

In step four, whether multi-picture secondary synthesizing is needed is determined, and if the multi-picture secondary synthesizing is needed, the multi-picture secondary synthesizing is performed, and then perform the next step; otherwise, perform the next step directly.

In step five, the synthesized image (which is a synthesized image having multi-picture of the bottom layer and a rectangular frame of the upper layer when there is multi-picture secondary synthesizing; and is multi-picture of the bottom layer when there is no multi-picture secondary synthesizing) is encoded and output.

In step six, the process ends.

Figure 4:
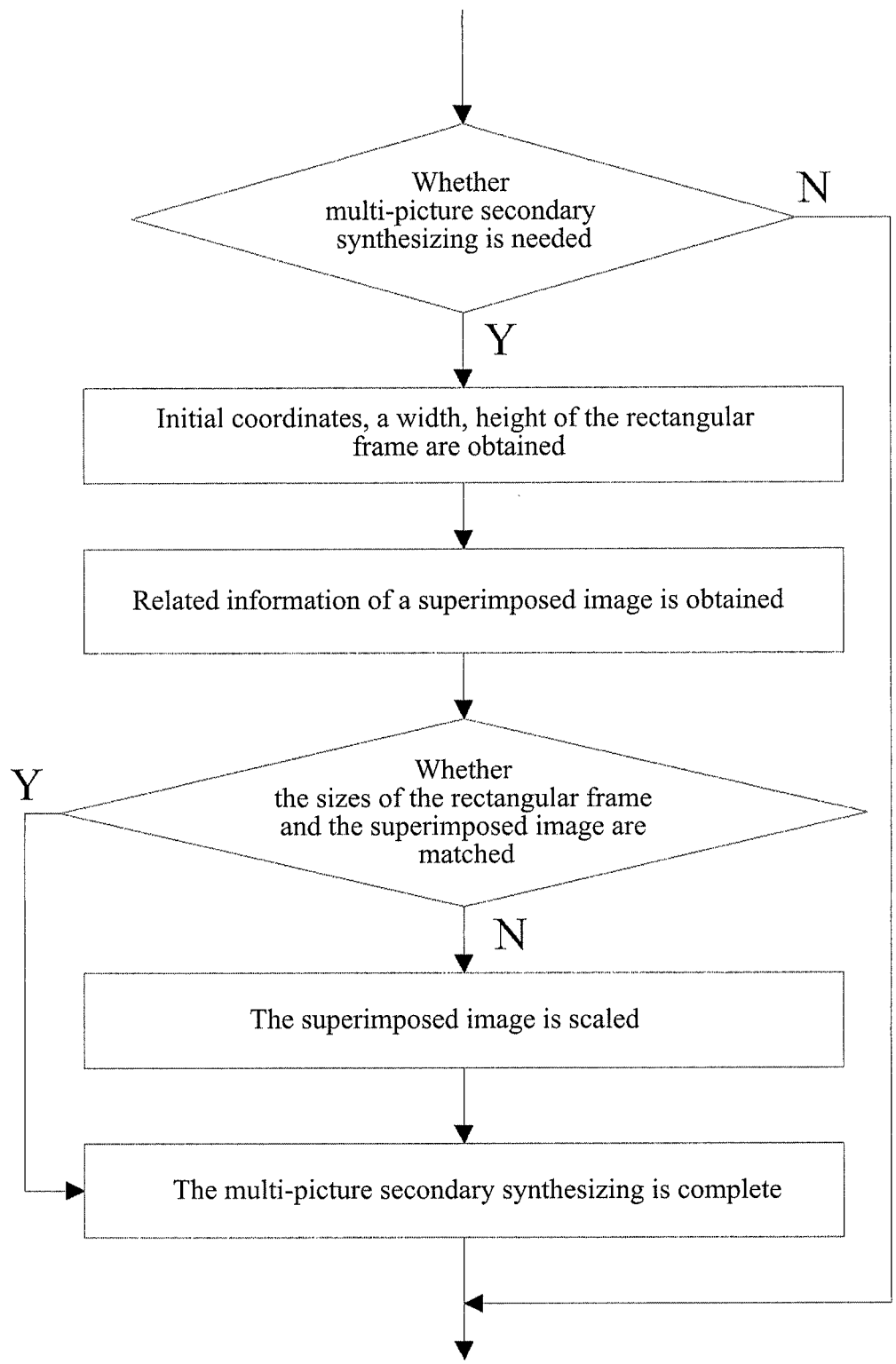
FIG. 4 is a detailed flowchart of processing of a multi-picture secondary synthesizing in processing of a DSP at a MCU side according to an example of the present invention.

FIG. 4 is a detailed flowchart of processing of multi-picture secondary synthesizing in processing of a DSP at a MCU side according to an example of the present invention. As shown in FIG. 4, the secondary picture synthesizing according to an example of the present invention primarily comprises the following steps.

In step one, whether the multi-picture secondary synthesizing is needed is determined, and if the multi-picture secondary synthesizing is needed, perform the next step; otherwise, the process ends.

In step two, information such as initial coordinates, a width, height of the rectangular frame etc. is obtained according to multi-picture secondary synthesizing information.

In step three, related information of a superimposed image is obtained (i.e., a pre-output picture which is output into the rectangular frame), for example, if it is one picture of the multiple pictures of the bottom layer, a picture number of the picture is obtained.

In step four, whether the sizes of the rectangular frame and the superimposed image are matched, i.e., whether the widths, heights of the rectangular frame and the superimposed image are equal, is determined, and if the sizes of the rectangular frame and superimposed image are matched, perform the next step; otherwise, perform step six.

In step five, the superimposed image is scaled.

In step six, the multi-picture secondary synthesizing is complete.

A multi-picture synthesizing apparatus in a conference television system according to an example of the present invention comprises an image bottom layer synthesizing module and an image frame synthesizing module set at a control end of the conference television system, wherein, the image bottom layer synthesizing module is configured to synthesize multiple pictures into a bottom layer of a multi-picture image according to a preset multi-picture layout; and the image frame synthesizing module is configured to create at least one layer of image layer over the bottom layer of the multi-picture image, create at least one image frame in each image layer, and adjust a pre-output picture corresponding to the image frame according to output characteristics of each image frame, and output the pre-output picture into the corresponding image frame.

The present invention overcomes problems and defects that the complexity of processing in the MCU is high and the flexibility of the multi-image display is bad in the existing multi-picture synthesizing technologies, and implements the multi-picture synthesizing of a conference television system simply and flexibly. For example, when it is needed to amplify one of multiple pictures temporarily for view, it is only needed to drag out a rectangular frame with a random size through a mouse in a WEB page and then drag the needed image into the rectangular frame, and close the rectangular frame directly after the viewing is complete.

For the processing in the MCU, there is no need to change the multi-picture layout A, and it is only needed for the MP to issue two messages concerning multi-picture secondary synthesizing to the DSP under the multi-picture layout A, i.e., a message of starting the multi-picture secondary synthesizing (comprising initial coordinates, a width, height of the rectangular frame which are set by the WEB page and images needed to be output to the rectangular frame) and a message of stopping the multi-picture secondary synthesizing. If they are set by a WEB page of the terminal, it is needed for the terminal to transmit the above secondary synthesizing message to the MP of the MCU; and if they are set by a WEB page of the MCU, the MP obtains the message from the WEB page directly. After completing the multi-picture synthesizing according to the layout A, the DSP scales the image needed to be transmitted to display according to the message of starting multi-picture secondary synthesizing which is issued by the MP in accordance with the size of the rectangular frame, and then performs secondary synthesizing on the picture onto the multi-picture image of the layout A according to the initial addresses of the rectangular frame.

The present invention reduces the complexity of the processing in the MCU, and implements more flexible and convenient display and adjustment of the multi-picture image, and is a high efficient multi-picture synthesizing method in a conference system.

The above contents are further detail illustration made on the present invention in conjunction with specific preferred embodiments; however, the above contents are only instances illustrated in order to facilitate understanding, and the specific implementation of the present invention should not be construed as only being limited to these descriptions. For a person having ordinary skill in the technical art to which the present invention belongs, on the premise of not departing from the concepts of the present invention, various possible equivalent changes or substitutions can be made, and all these changes or substitutions should belong to the protection scope of the present invention.

What is claimed is:

1. A multi-picture synthesizing method in a conference television system comprising:
   a digital signal processor (DSP) synthesizing multiple pictures into a bottom layer of a multi-picture image according to a preset multi-picture layout; wherein the multiple pictures are arranged on the bottom layer from left to right and from top to bottom in turn, in order to synthesize the bottom layer of a multi-picture;
   the DSP creating at least one layer of image layer over the bottom layer of the multi-picture image, creating at least one image frame in each image layer, and adjusting a pre-output picture corresponding to the image frame according to output characteristics of each image frame, and outputting the pre-output picture into the corresponding image frame.

2. The method according to claim 1 wherein the output characteristics of the image frame comprise a position of the image frame and a size of the image frame.

3. The method according to claim 1 wherein the image frame is created through a mouse signal in a WEB page.

4. The method according to claim 3 further comprising: closing the image frame through a mouse signal in the WEB page.

5. The method according to claim 1 further comprising:
   adjusting layers and/or output characteristics of various image frames of various layers over the bottom layer of the multi-picture image.

6. The method according to claim 1 wherein the pre-out picture is a picture in the bottom layer of the multi-picture image or is other picture transmitted to display.

7. The method according to claim 2 further comprising:
   adjusting layers and/or output characteristics of various image frames of various layers over the bottom layer of the multi-picture image.

8. The method according to claim 3 further comprising:
   adjusting layers and/or output characteristics of various image frames of various layers over the bottom layer of the multi-picture image.

9. The method according to claim 4 further comprising:
   adjusting layers and/or output characteristics of various image frames of various layers over the bottom layer of the multi-picture image.

10. The method according to claim 2 wherein the pre-out picture is a picture in the bottom layer of the multi-picture image or is other picture transmitted to display.

11. The method according to claim 3 wherein the pre-out picture is a picture in the bottom layer of the multi-picture image or is other picture transmitted to display.

12. The method according to claim 4 wherein the pre-out picture is a picture in the bottom layer of the multi-picture image or is other picture transmitted to display.

13. A multi-picture synthesizing apparatus in a conference television system comprising an image bottom layer synthesizing module and an image frame synthesizing module set at a control end of the conference television system, wherein,
the image bottom layer synthesizing module is configured to synthesize multiple pictures into a bottom layer of a multi-picture image according to a preset multi-picture layout;
wherein the multiple pictures are arranged on the bottom layer from left to right and from top to down in turn, in order to synthesize the bottom layer of a multi-picture;
the image frame synthesizing module is configured to create at least one layer of image layer over the bottom layer of the multi-picture image, create at least one image frame in each image layer, and adjust a pre-output picture corresponding to the image frame according to output characteristics of each image frame, and output the pre-output picture into the corresponding image frame.

14. The apparatus according to claim 13 wherein the output characteristics of the image frame comprise a position of the image frame and a size of the image frame.

15. The apparatus according to claim 13 further comprising:
an image frame adjusting module, configured to adjust layers and/or output characteristics of various image frames of various layers over the bottom layer of the multi-picture image.

16. The apparatus according to claim 13 wherein the pre-out picture is a picture in the bottom layer of the multi-picture image or is another picture transmitted to display.

17. The apparatus according to claim 14 further comprising:
an image frame adjusting module, configured to adjust layers and/or output characteristics of various image frames of various layers over the bottom layer of the multi-picture image.

18. The apparatus according to claim 14 wherein the pre-out picture is a picture in the bottom layer of the multi-picture image or is other picture transmitted to display.

* * * * *